(12) United States Patent
Mochizuki

(10) Patent No.: US 11,153,541 B2
(45) Date of Patent: Oct. 19, 2021

(54) ILLUMINATOR AND DISPLAY APPARATUS

(71) Applicant: SONY CORPORATION, Tokyo (JP)

(72) Inventor: Takahiro Mochizuki, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 17/267,111

(22) PCT Filed: Aug. 8, 2019

(86) PCT No.: PCT/JP2019/031308
§ 371 (c)(1),
(2) Date: Feb. 9, 2021

(87) PCT Pub. No.: WO2020/045025
PCT Pub. Date: Mar. 5, 2020

(65) Prior Publication Data
US 2021/0168340 A1    Jun. 3, 2021

(30) Foreign Application Priority Data
Aug. 31, 2018 (JP) .............................. JP2018-162309

(51) Int. Cl.
*H04N 9/31* (2006.01)
*G02F 1/137* (2006.01)

(52) U.S. Cl.
CPC ....... *H04N 9/3155* (2013.01); *G02F 1/13731* (2013.01); *H04N 9/3167* (2013.01)

(58) Field of Classification Search
CPC .... H04N 9/3167; H04N 9/3155; H04N 9/312; H04N 9/3132; H04N 9/3108;
(Continued)

(56) References Cited

U.S. PATENT DOCUMENTS 8,077,196 B2    12/2011  Kao et al.
2010/0328433 A1*  12/2010  Li .................... G03H 1/2294
                                                        348/46
(Continued)

FOREIGN PATENT DOCUMENTS

JP    2011-151640    8/2011
JP    2016-177129    10/2016
(Continued)

OTHER PUBLICATIONS

International Search Report prepared by the Japan Patent Office dated Oct. 2, 2019, for International Application No. PCT/JP2019/031308.

*Primary Examiner* — Sherrie Hsia
(74) *Attorney, Agent, or Firm* — Sheridan Ross P.C.

(57) ABSTRACT

An illuminator according to the present disclosure includes a light source section and an optical phase modulator. The light source section emits light including first and second polarization components. The optical phase modulator generates and emits first illumination light (SDR illumination light) and second illumination light (HDR illumination light) The first illumination light is used in a light intensity modulator to generate an image in a first luminance region. The second illumination light is used in the light intensity modulator to generate an image in a second luminance region The optical phase modulator emits, as the first illumination light, light of the first polarization component without performing phase modulation. The optical phase modulator performs phase modulation on light of the second polarization component on the basis of the image in the second luminance region, and emits the phase-modulated light as the second illumination light.

13 Claims, 10 Drawing Sheets

(58) Field of Classification Search
CPC .... H04N 9/3102; H04N 9/315; H04N 9/3197;
H04N 9/31; G02F 1/13731
USPC .......................... 348/739, 744, 759, 770–775
See application file for complete search history.

(56) References Cited

U.S. PATENT DOCUMENTS

| | | |
|---|---|---|
| 2016/0295178 A1 | 10/2016 | Damberg et al. |
| 2017/0078629 A1 | 3/2017 | Kozak et al. |
| 2020/0366369 A1* | 11/2020 | Kyosuna ................ H04B 10/67 |

FOREIGN PATENT DOCUMENTS

| | | |
|---|---|---|
| JP | 2017-505555 | 2/2017 |
| JP | 2017-518695 | 7/2017 |

* cited by examiner

ILLUMINATOR AND DISPLAY APPARATUS

CROSS REFERENCE TO RELATED APPLICATIONS

This application is a national stage application under 35 U.S.C. 371 and claims the benefit of PCT Application No. PCT/JP2019/031308 having an international filing date of 8 Aug. 2019, which designated the United States, which PCT application claimed the benefit of Japanese Patent Application No. 2018-162309 filed 31 Aug. 2018, the entire disclosures of each of which are incorporated herein by reference.

TECHNICAL FIELD

The present disclosure relates to an illuminator and a display apparatus that are each capable of achieving a high dynamic range.

BACKGROUND ART

One method of achieving a display that is able to provide a realistic image which makes one feel as if he or she sees a real scene is to achieve high peak luminance or a high dynamic range. In recent years, the HDR standard has attracted attention as a technique for increasing the dynamic range. For example, PTL 1 proposes a technique that combines a main projector and a highlight projector to achieve a high luminance projection display with high peak luminance and a high dynamic range. The main projector is provided for an image region having a low luminance level. The highlight projector is provided for an image region having a high luminance level or more. This technique uses separate light sources for the highlight projector and the main projector.

CITATION LIST

Patent Literature

PTL 1: Japanese Unexamined Patent Application Publication No. 2017-142508

SUMMARY OF THE INVENTION

The technique of combining a highlight projector and a main projector uses separate light sources. Therefore, while freedom of light source selection is increased, a configuration of an optical system becomes complicated.

It is desirable to provide an illuminator and a projector that are each able to achieve a high dynamic range with a simple configuration.

An illuminator according to one embodiment of the present disclosure includes a light source section and an optical phase modulator. The light source section emits light including a first polarization component and a second polarization component. The first polarization component and the second polarization component are different from each other in polarization direction. The optical phase modulator generates first illumination light and second illumination light on the basis of the light emitted from the light source section and emits the first illumination light and the second illumination light. The first illumination light is used in a light intensity modulator to generate an image in a first luminance region. The second illumination light is used in the light intensity modulator to generate an image in a second luminance region. The second luminance region has a luminance higher than that of the first luminance region. The optical phase modulator emits, as the first illumination light, light of the first polarization component of the light emitted from the light source section without performing phase modulation. The optical phase modulator performs phase modulation on light of the second polarization component of the light emitted from the light source section on the basis of the image in the second luminance region, and emits the phase-modulated light as the second illumination light.

A display apparatus according to one embodiment of the present disclosure includes an illuminator and a light intensity modulator. The light intensity modulator that performs intensity modulation on illumination light from the illuminator to generate an image. The illuminator includes the illuminator according to the embodiment of the present disclosure.

In the illuminator or the display apparatus according to the embodiment of the present disclosure, the optical phase modulator generates and emits the first illumination light and the second illumination light. The first illumination light is used in the light intensity modulator to generate the image in the first luminance region. The second illumination light is used in the light intensity modulator to generate the image in the second luminance region having the luminance higher than that of the first luminance region. The optical phase modulator emits, as the first illumination light, the light of the first polarization component of the light emitted from the light source section without performing phase modulation. The optical phase modulator performs phase modulation on the light of the second polarization component of the light emitted from the light source section on the basis of the image in the second luminance region, and emits the phase-modulated light as the second illumination light.

MODES FOR CARRYING OUT THE INVENTION

Embodiments of the present disclosure are described below in detail with reference to the drawings. Note that the description will be given in the following order.
0. Comparative Example
1. First Embodiment
1.0 Overview of Illuminator and Display Apparatus According to First Embodiment
1.1 Example of Overall Configuration of Illuminator and Display Apparatus According to
First Embodiment (FIGS. 1 to 4)
1.2 Examples of Configuration of Main Part of Illuminator and Display Apparatus
According to First Embodiment (FIGS. 5 to 12)
1.3 Effects
2. Other Embodiments

0. Comparative Example (Overview and Problem of Illuminator and Display Apparatus According to Comparative Example)

When the brightness of the sun shot outdoors is measured, the brightness exceeds, for example, 10,000 cd/m$^2$. In contrast, the night sky shot at night is extremely dark, for example, 0.001 cd/m$^2$ or less. If it is possible to faithfully reproduce an image with a high dynamic range from such a dark scene to a bright scene of 10,000 cd/m$^2$ or more, such a display apparatus achieves great reality.

However, it is difficult to achieve such a high dynamic range with a display apparatus such as a typical projector. The reason is as follows. For example, assume a projector projecting an image of a screen size of about hundred inches. The luminance of a projector which is widely used in the world today is only about 500 cd/m$^2$ at most. Therefore, unless the luminance of a light source is increased by a factor of several tens to a hundred or more, peak luminance of 10,000 cd/m$^2$ or more cannot be achieved for hundred inches. This is not practical.

In contrast, PTL 1 proposes a technique of combining a main projector and a highlight projector for achieving a projector having high peak luminance and a high dynamic range. According to the technique described in PTL 1, the main projector is provided for a relatively dark part of an image, for example, an image region of a low luminance level which can be reproduced by a typical projector. The other highlight projector is provided, for example, for an image region of a high luminance level or more which cannot be reproduced by a typical projector. Images having these two luminance levels are superimposed in the projector or on a screen. Thus, an image having high peak luminance and a high dynamic range is achieved.

However, in the technique described in PTL 1, separate light sources are used for the highlight projector and the main projector. Therefore, while freedom of light source selection is increased, a configuration of an optical system becomes complicated.

Therefore, it is desired to develop an illuminator and a display apparatus that are each able to achieve a high dynamic range with a simple configuration.

1. First Embodiment

[1.0 Overview of Illuminator and Display Apparatus According to First Embodiment]

Figure 1:
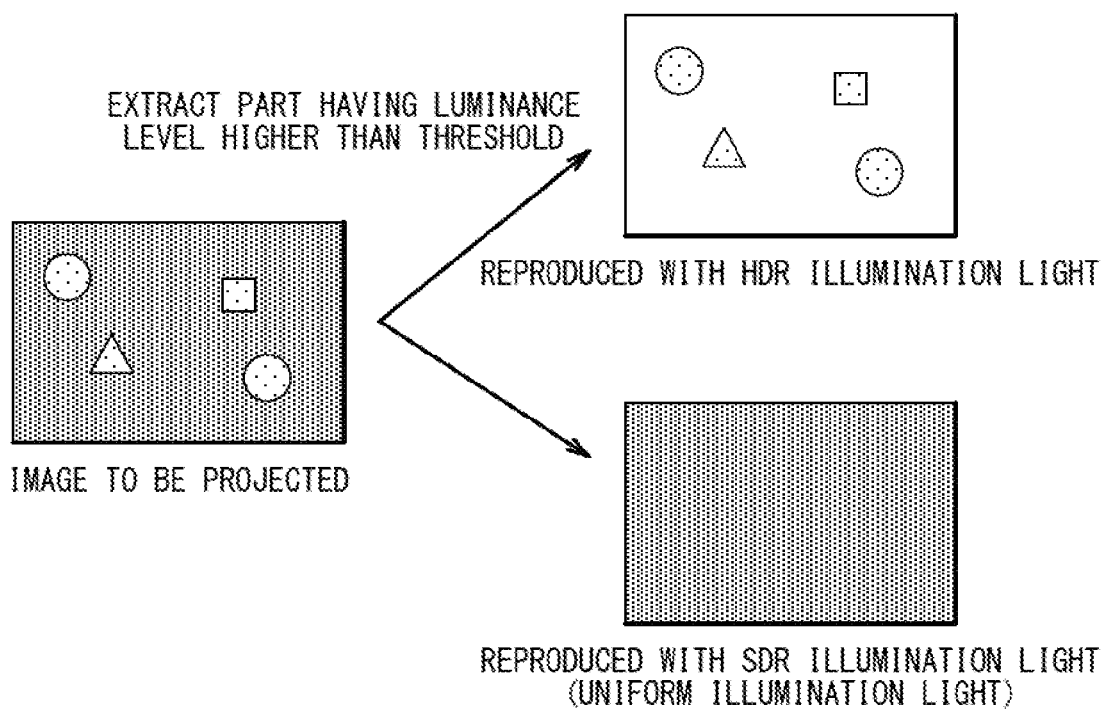
FIG. 1 is an explanatory diagram schematically illustrating an outline of images generated by a display apparatus according to a first embodiment of the present disclosure.

FIG. 1 schematically illustrates an overview of images generated by a display apparatus according to a first embodiment of the present disclosure.

The display apparatus according to the present embodiment is, for example, a projector. The display apparatus according to the present embodiment includes a light intensity modulator that performs intensity modulation on illumination light from an illuminator according to the present embodiment to generate an image (a projection image).

In the present embodiment, in order to provide a projector that achieves an image having high peak luminance and a high dynamic range, the illumination light is generated by an illumination optical system (the illuminator) utilizing a spatial optical phase modulator such as an SLM (Spatial Light Modulator) as a diffractor. In this case, as illustrated in FIG. 1, an image region having a luminance level higher than a predetermined threshold is extracted from an image to be projected. An image region having a low luminance level is mainly reproduced using SDR (Standard Dynamic Range) illumination light (uniform illumination light). An image region having a high luminance level is reproduced mainly using HDR (High Dynamic Range) illumination light.

In the illuminator according to the present embodiment, as will be described later, the SDR illumination light and the HDR illumination light are generated by distributing the light from a single light source section with use of a single diffractor. Here, the threshold for determining the high and low of the luminance level of the image can be freely set. Depending on how the threshold is determined, a distribution ratio between the SDR illumination light and the HDR illumination light can be varied freely.

Figure 2:
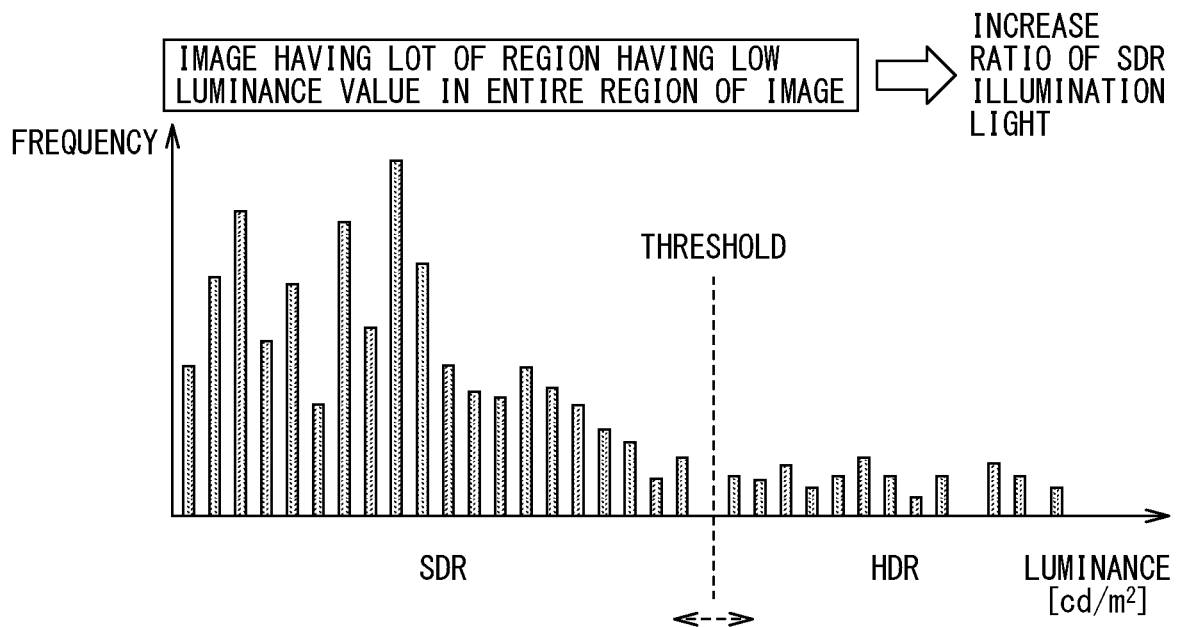
FIG. 2 is an explanatory diagram schematically illustrating a first example of a histogram of luminance values of an image generated by the display apparatus according to the first embodiment.
Figure 3:
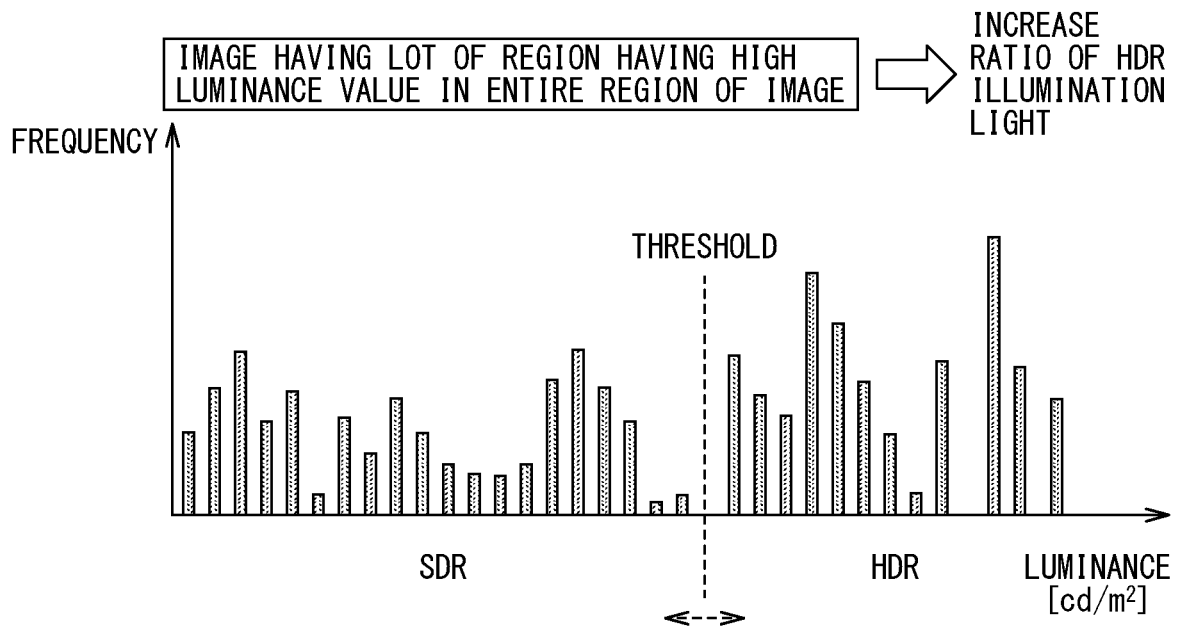
FIG. 3 is an explanatory diagram schematically illustrating a second example of the histogram of the luminance values of the image generated by the display apparatus according to the first embodiment.

FIG. 2 schematically illustrates a first example of a histogram of luminance values of an image generated by the display apparatus according to the first embodiment. FIG. 3 schematically illustrates a second example of the histogram of the luminance values of the image generated by the display apparatus according to the first embodiment.

In FIGS. 2 and 3, a horizontal axis indicates the luminance and a vertical axis indicates a frequency. FIG. 2 illustrates an example of a histogram in a case where there are many pixels with a low luminance value in an image as a whole. FIG. 3 illustrates an example of a histogram in a case where there are many pixels with a high luminance value in an image as a whole.

Regarding a certain image, determination as to whether the image as a whole is an image having a high luminance level or an image having a low luminance level can be made by determining, with the threshold as a border, which of a frequency of pixels having a luminance value lower than the threshold or a frequency of pixels having a luminance value higher than the threshold is greater. In this case, the method of determining the threshold may be fixed to a certain value. However, the method of determining the threshold may be varied depending on the image. In a case of a system in which a light amount ratio between the SDR illumination light and the HDR illumination light can be varied freely, for example, the brightness of the image as a whole is maintained by increasing the ratio of the light amount of the SDR illumination light in an image having a lot of region having a low luminance value in the entire region of the image. In contrast, higher peak luminance can be achieved by increasing a ratio of the amount of light used as the HDR illumination light, in an image having a lot of region having a high luminance value in the image as a whole.

(Modification of Method of Determining Light Amount Ratio between SDR Illumination Light and HDR Illumination Light)

In the illuminator according to the present embodiment, the method of determining the light amount ratio between the SDR illumination light and the HDR illumination light may be set with reference to the histogram of the luminance values as illustrated in FIGS. 2 and 3. However, it is also possible to set it to a light amount ratio taking into consideration a shooting mode at the time of shooting. For example, in a case of an image shot in a night scene mode, it is highly likely that the image has been shot in a dark place. Therefore, for example, the amount of light distributed to the HDR illumination light can be intentionally increased.

Further, the HDR illumination light is generated with diffracted light from the diffractor (optical phase modulator) as will be described later. Therefore, diffraction loss is unavoidable. In the illuminator according to the present embodiment, in a case of setting the light amount ratio between the SDR illumination light and the HDR illumination light, it is also possible to set it to a light amount ratio taking into consideration the diffraction loss. As an example, consider a case where 50% diffraction loss is caused. In a case where the light amount ratio between the SDR illumination light and the HDR illumination light is to be a ratio of 1:1 on a screen, the distribution ratio between the SDR illumination light and the HDR illumination light is set to 1:2 in advance. Thereby, with the influence of the 50% diffraction loss in generating the HDR illumination light, it is possible to achieve the light amount ratio of 1:1 on the screen. Thus, in the illuminator according to the present embodiment, it is also possible to set the distribution ratio between the SDR illumination light and the HDR illumination light taking into consideration the diffraction loss. It goes without saying that, in a case where transmission efficiency of the optical devices between the diffractor and the screen differs between the SDR illumination light and the HDR illumination light, the distribution ratio can be set to offset such a difference.

[1.1 Example of Overall Configuration of Illuminator and Display Apparatus According to First Embodiment]

Figure 4:
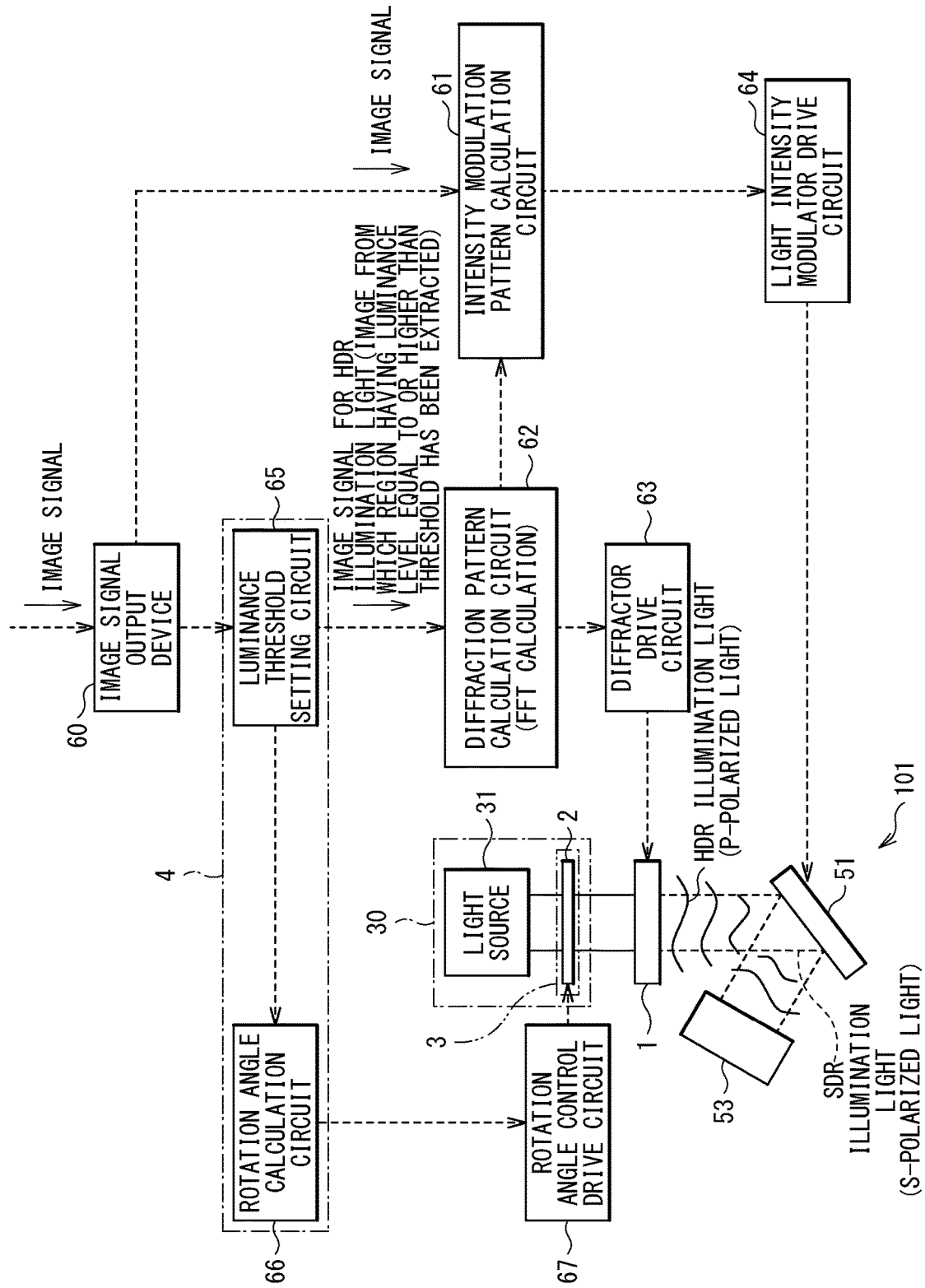
FIG. 4 is a configuration diagram schematically illustrating an example of an overall configuration of an illuminator and the display apparatus according to the first embodiment.

FIG. 4 schematically illustrates an example of an overall configuration of the illuminator and the display apparatus according to the first embodiment.

FIG. 4 illustrates a configuration example of a projector 101 including the illuminator according to the first embodiment, as an example of the display apparatus according to the first embodiment. Note that FIG. 4 illustrates the configuration example in a case of performing single color image display for simplification. However, in a case of displaying a color image, the configuration needs to include an illuminator corresponding to, for example, three colors of red, green, and blue.

In the following, a description is given of an example case where first illumination light in the technology of the present disclosure is the SDR illumination light and second illumination light in the technology of the present disclosure is the HDR illumination light. Further, a description is given of an example case where a first polarization component in the technology of the present disclosure is S-polarized light, and a second polarization component in the technology of the present disclosure is P-polarized light.

The projector 101 includes an image signal output device 60, an intensity modulation pattern calculation circuit 61, a diffraction pattern calculation circuit 62, a diffractor drive circuit 63, a light intensity modulator drive circuit 64, a polarization ratio and light amount ratio calculating section 4, and a rotation angle control drive circuit 67. The polarization ratio and light amount ratio calculating section 4 includes a luminance threshold setting circuit 65 and a rotation angle calculation circuit 66. Further, the projector 101 includes a diffractor 1, a light source section 30, a light intensity modulator 51, and a projection lens 53.

In the configuration example in FIG. 4, a part that generates illumination light for the light intensity modulator 51, mainly, the light source section 30, the diffractor 1, and a circuit configuration part related to driving thereof correspond to one specific example of the illuminator in the technology of the present disclosure.

The light source section 30 has a light source 31, a half-wave retarder 2, and a half-wave retarder rotation mechanism 3. The half-wave retarder 2 is a component which light emitted from the light source 31 enters. The half-wave retarder rotation mechanism 3 rotates the half-wave retarder 2. The half-wave retarder 2 corresponds to one specific example of a first half-wave retarder in the technology of the present disclosure.

The light source section 30 emits light that includes the first polarization component (the S-polarized light) and the second polarization component (the P-polarized light) that differ in polarization direction from each other. The light source section 30 has a configuration in which the polarization ratio between the S-polarized light and the P-polarized light is allowed to be varied by rotating the half-wave retarder 2.

It is desirable that the light source 31 be a light source that emits coherent light with high coherence like a laser. However, the light source 31 may be a light source such as an LED (Light Emitting Diode), a phosphor light source, or a lamp. Note that, in a case of using the LED, the phosphor light source, the lamp, or the like as the light source 31, as in a configuration example illustrated in FIG. 6 described later, it is preferable to additionally insert an optical device that aligns polarized light in one direction, for example, a PS converter 22, between the light source 31 and the half-wave retarder 2.

It is desirable that the light source 31 be shaped to have a size same as that of the light intensity modulator 51 or to have a size that can include the light intensity modulator 51. If the light intensity modulator 51 is larger in aperture size than the diffractor 1, it is preferable to put an optical system expanding a beam diameter between the diffractor 1 and the light intensity modulator 51.

The light intensity modulator 51 performs intensity modulation on the illumination light to generate an image. The light intensity modulator 51 is, for example, a DMD (Digital Micromirror Device). The light intensity modulator 51 may be, for example, a transmissive or reflective liquid crystal display device. Note that, FIG. 4 illustrates an example case where the light intensity modulator 51 is the reflective light intensity modulator.

The diffractor 1 is, for example, a transmissive or reflective optical phase modulator. Note that FIG. 4 illustrates an example case where the diffractor 1 is a transmissive optical phase modulator.

The diffractor 1 generates the SDR illumination light and the HDR illumination light on the basis of the light emitted from the light source section 30, and emits them. The SDR illumination light is used in the light intensity modulator 51 to generate an image in a first luminance region (low luminance region). The HDR illumination light is used in the light intensity modulator 51 to generate an image in a second luminance region (high luminance region) having luminance higher than that in the first luminance region.

The diffractor 1 emits, as the SDR illumination light, light of the first polarization component (the S-polarized light) of the light emitted from the light source section 30 without performing phase modulation. Further, the diffractor 1 performs phase modulation on light of the second polarization component (the P-polarized light) of the light emitted from the light source section 30 on the basis of the image in the high luminance region, and emits the light as the HDR illumination light.

The image signal output device 60 divides the received image signal into two image signals, and supplies the two image signals to the intensity modulation pattern calculation circuit 61 and the luminance threshold setting circuit 65.

The luminance threshold setting circuit 65 sets a threshold used to determine whether it is an image having a high luminance level (an image in the high luminance region) or an image having a low luminance level (an image in the low luminance region), as illustrated in FIGS. 2 and 3. For example, of the received image signals, an image signal from which a region having a luminance level equal to or higher than the threshold set by the luminance threshold setting circuit 65 is extracted is used as an HDR illumination light image signal.

The diffraction pattern calculation circuit 62 calculates, on the basis of the HDR illumination light image signal, a diffraction pattern to be displayed at the diffractor 1. The diffraction pattern displayed at the diffractor 1 is a diffraction pattern that allows for formation of an illumination image having a luminance distribution in accordance with the image in the high luminance region to be displayed at the light intensity modulator 51. The diffraction pattern calculation circuit 62 calculates, for example, the diffraction pattern by repeatedly performing FFT (Fast Fourier Transform) calculation. Further, the diffraction pattern calculation circuit 62 supplies an illumination light intensity modulation pattern signal to the intensity modulation pattern calculation circuit 61. The illumination light intensity modulation pattern signal represents information of the luminance distribution of the illumination image formed with use of the diffraction pattern.

The diffractor drive circuit 63 drives the diffractor 1 to display the diffraction pattern calculated by the diffraction pattern calculation circuit 62.

The intensity modulation pattern calculation circuit 61 calculates, on the basis of the image signal, an intensity modulation pattern for generating an image to be displayed at the light intensity modulator 51. At this time, the intensity modulation pattern calculation circuit 61 calculates an intensity modulation pattern taking into consideration the information of the luminance distribution of the illumination image derived from the diffractor 1.

The light intensity modulator drive circuit 64 so drives the light intensity modulator 51 as to generate the intensity modulation pattern calculated by the intensity modulation pattern calculation circuit 61.

Applied to the light intensity modulator 51 via the diffractor 1 are the SDR illumination light and the HDR illumination light as the illumination light. The light intensity modulator 51 performs intensity modulation on the applied illumination light on the basis of the intensity modulation pattern calculated by the intensity modulation pattern calculation circuit 61, and generates a projection image. As described above, the information of the luminance distribution of the illumination image derived from the diffractor 1 is taken into consideration in the intensity modulation pattern calculated by the intensity modulation pattern calculation circuit 61. Therefore, the light intensity modulator 51 generates a projection image that reproduces the original image signal as a result.

The projection image generated by the light intensity modulator 51 is emitted toward the projection lens 53. The projection lens 53 is a projection optical system including a plurality of lenses. The projection lens 53 projects the projection image generated by the light intensity modulator 51 onto an unillustrated projection surface such as a screen.

The polarization ratio and light amount ratio calculating section 4 determines the polarization ratio of the light source section 30 on the basis of the image signal. The polarization ratio and light amount ratio calculating section 4 so determines the polarization ratio between the S-polarized light and the P-polarized light that the light amount of the SDR illumination light becomes a light amount based on a ratio of the image in the low luminance region included in the image signal, and the light amount of the HDR illumination light becomes a light amount based on a ratio of the image in the high luminance region included in the image signal.

Moreover, the polarization ratio and light amount ratio calculating section 4 may so determine the polarization ratio that the light amount ratio between the light amount of the SDR illumination light and the light amount of the HDR illumination light becomes a value taking into consideration a shooting mode used upon generation of the image signal.

Moreover, the polarization ratio and light amount ratio calculating section 4 may so determine the polarization ratio that the light amount ratio between the light amount of the SDR illumination light and the light amount of the HDR illumination light becomes a value taking into consideration the light amount loss caused upon the phase modulation performed by the diffractor 1.

The rotation angle calculation circuit 66 calculates a rotation angle of the half-wave retarder 2 that allows for the polarization ratio determined by the polarization ratio and light amount ratio calculating section 4. Thus, the rotation angle of the half-wave retarder 2 for optimizing the light amount ratio between the SDR illumination light and the HDR illumination light is calculated. The rotation angle control drive circuit 67 so controls the half-wave retarder rotation mechanism 3 that the rotation angle of the half-wave retarder 2 becomes the rotation angle calculated by the rotation angle calculation circuit 66.

[1.2 Examples of Configuration of Main Part of Illuminator and Display Apparatus According to First Embodiment]

Next, specific configuration examples of the diffractor 1 and the light intensity modulator 51 are described. Note that, in a projector according to each of the configuration examples below, the configurations of a circuit processing an image signal, a drive circuit, and the like may be substantially similar to those of the projector 101 in FIG. 4. In the following, parts substantially the same as those of the projector 101 in FIG. 4 are denoted by the same reference numerals, and descriptions thereof will be omitted as appropriate.

First Configuration Example

Figure 5:
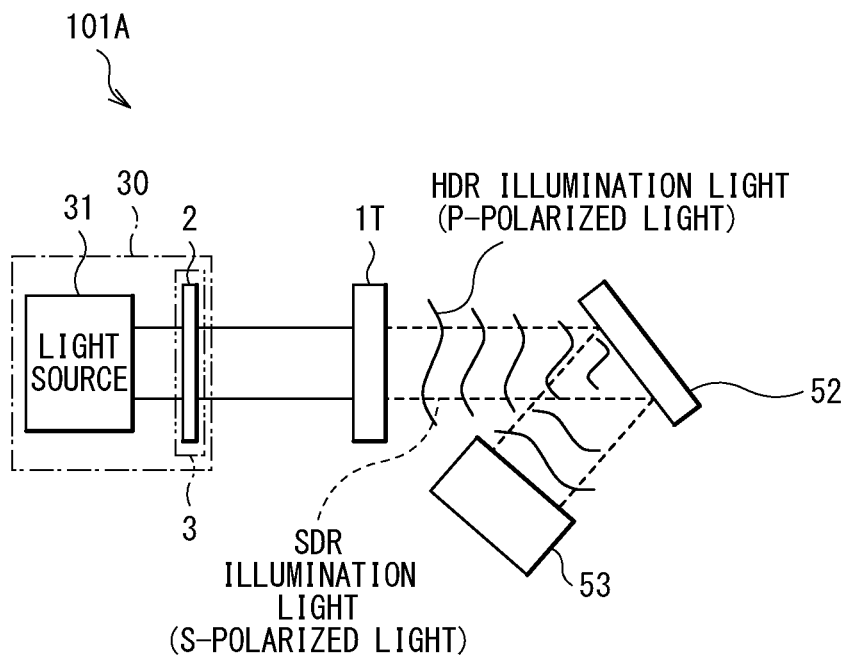
FIG. 5 is a configuration diagram schematically illustrating a configuration of a main part of a projector according to a first configuration example of the first embodiment.

FIG. 5 schematically illustrates a configuration of a main part of a projector 101A according to a first configuration example of the first embodiment.

The projector 101A according to the first configuration example describes a configuration example in a case where the diffractor 1 is a transmissive diffractor 1T (a transmissive optical phase modulator), and the light intensity modulator 51 is a DMD 52 (a reflective light intensity modulator). The transmissive diffractor 1T is, for example, a transmissive liquid crystal display device.

In the projector 101A according to the first configuration example, it is desirable that the light source 31 be a light source that emits coherent light with high coherence like a laser.

For example, if the transmissive diffractor 1T is a diffractor that performs phase modulation only on the P-polarized light, the S-polarized light of the entering light is transmitted as it is without undergoing phase modulation. This transmitted light becomes the SDR illumination light. Meanwhile, the P-polarized light component is subjected to phase modulation with the desired diffraction pattern and becomes the HDR illumination light.

Other configurations may be substantially similar to those of the projector 101 illustrated in FIG. 4.

Second Configuration Example

Figure 6:
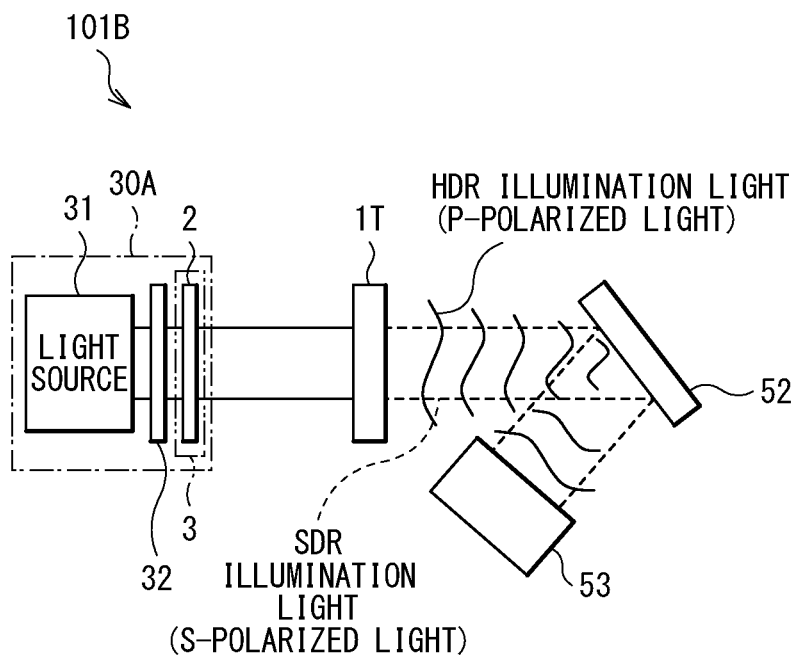
FIG. 6 is a configuration diagram schematically illustrating a configuration of a main part of a projector according to a second configuration example of the first embodiment.

FIG. 6 schematically illustrates a configuration of a main part of a projector 101B according to a second configuration example of the first embodiment.

The projector 101B according to the second configuration example includes a light source section 30A instead of the light source section 30 in the projector 101A according to the first configuration example illustrated in FIG. 5. The light source section 30A includes the light source 31, the PS converter 22, and the half-wave retarder 2.

In the projector 101B according to the second configuration example, the light source 31 is not limited to a light source that emits coherent light with high coherence like a laser. The light source 31 may be a light source such as an LED, a phosphor light source, or a lamp. In a case of using the LED, the phosphor light source, the lamp, or the like as the light source 31, as in the projector 101B according to the second configuration example, it is preferable to additionally insert the optical device that aligns polarized light in one direction, for example, the PS converter 22, between the light source 31 and the half-wave retarder 2.

Other configurations may be substantially similar to those of the projector 101 illustrated in FIG. 4 or the projector 101A illustrated in FIG. 5.

Third Configuration Example

Figure 7:
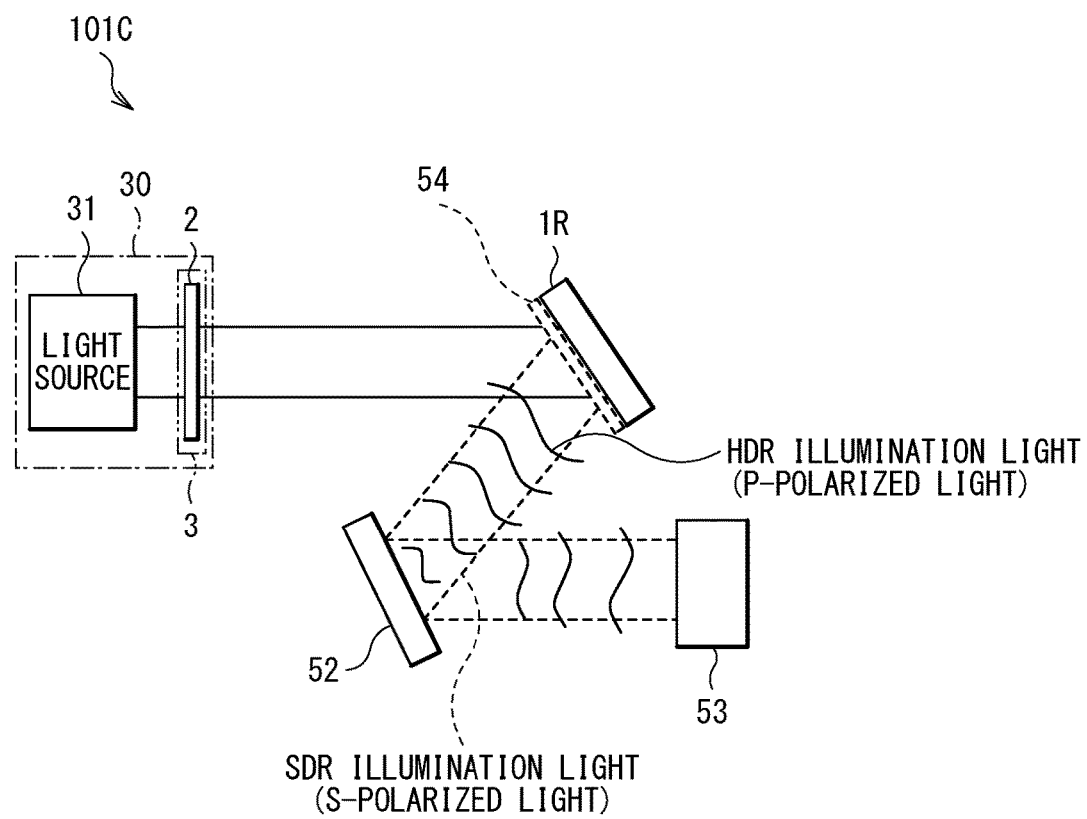
FIG. 7 is a configuration diagram schematically illustrating a configuration of a main part of a projector according to a third configuration example of the first embodiment.

FIG. 7 schematically illustrates a configuration of a main part of a projector 101C according to a third configuration example of the first embodiment.

The projector 101C according to the third configuration example describes a configuration example in a case where the diffractor 1 is a reflective diffractor 1R (a reflective optical phase modulator), and the light intensity modulator 51 is the DMD 52 (a reflective light intensity modulator). The reflective diffractor 1R is, for example, a reflective liquid crystal display device.

Note that, although not necessarily required, it is preferable that a wire grid polarizer 54 be disposed in front of the reflective diffractor 1R. Alternatively, it is preferable that a surface of the reflective diffractor 1R be provided with a polarization-separation coating that highly reflects the S-polarized light and highly transmits the P-polarized light. As a result, an improvement in light use efficiency is expectable.

Other configurations may be substantially similar to those of the projector 101 illustrated in FIG. 4 or the projector 101A illustrated in FIG. 5.

Moreover, in the projector 101C illustrated in FIG. 7, the light source section 30 may be configured by the light source section 30A including a PS converter 32, as with the projector 101B illustrated in FIG. 6.

Fourth Configuration Example

Figure 8:
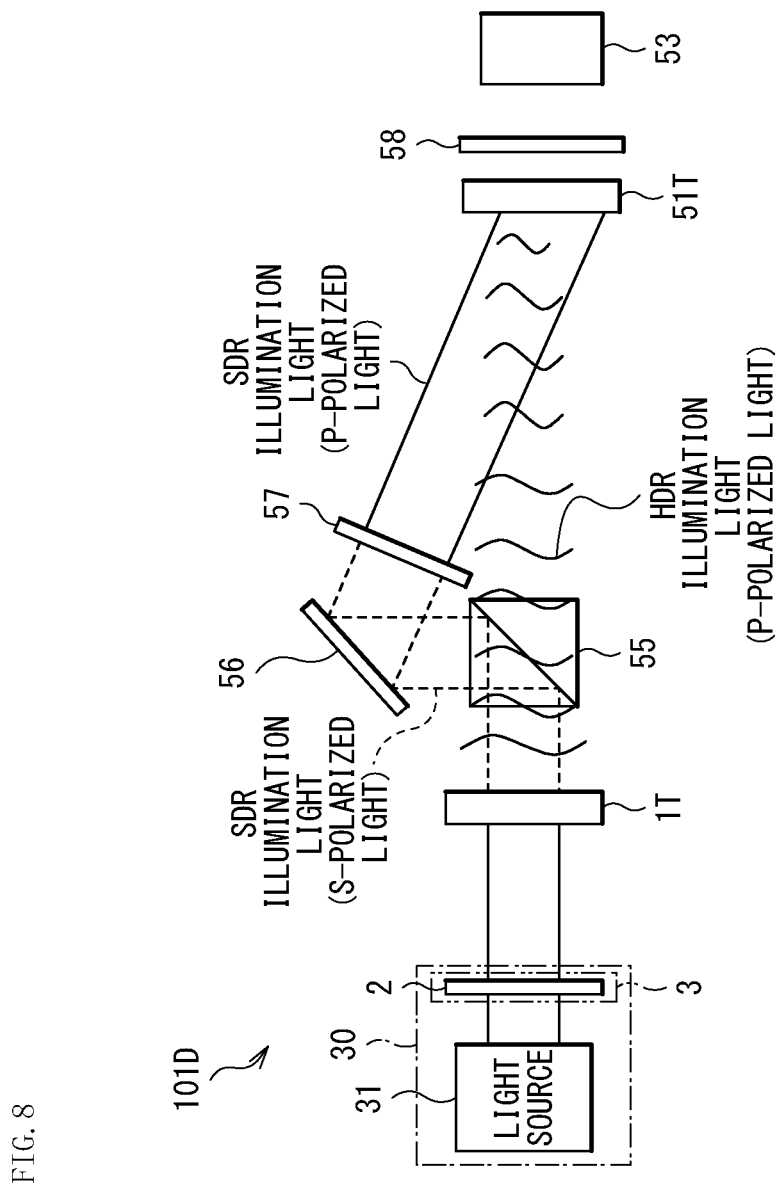
FIG. 8 is a configuration diagram schematically illustrating a configuration of a main part of a projector according to a fourth configuration example of the first embodiment.

FIG. 8 schematically illustrates a configuration of a main part of a projector 101D according to a fourth configuration example of the first embodiment.

The projector 101D according to the fourth configuration example describes a configuration example in a case where the diffractor 1 is the transmissive diffractor 1T (a transmissive optical phase modulator), and the light intensity modulator 51 is a transmissive liquid crystal display device 51T (a transmissive light intensity modulator). The transmissive diffractor 1T is, for example, a transmissive liquid crystal display device.

Moreover, the projector 101D according to the fourth configuration example includes a polarization beam splitter 55, a reflection mirror 56, a half-wave retarder 57, and an analyzer 58. The half-wave retarder 57 corresponds to one specific example of the second half-wave retarder in the technology of the present disclosure. The analyzer 58 is disposed between the transmissive liquid crystal display device 51T and the projection lens 53.

The polarization beam splitter 55 is an optical path separator that separates the optical path of the SDR illumination light emitted from the transmissive diffractor 1T and the optical path of the HDR illumination light emitted from the transmissive diffractor 1T.

The half-wave retarder 57 is disposed on one of the optical path of the SDR illumination light and the optical path of the HDR illumination light.

In a case where the light intensity modulator 51 is the transmissive liquid crystal display device 51T, it is necessary that the polarization of the SDR illumination light and the polarization of the HDR illumination light are aligned. Therefore, first, a device that performs separation on the basis of polarization, for example, the polarization beam splitter 55, is disposed between the transmissive diffractor 1T and the transmissive liquid crystal display device 51T to separate the optical path of the SDR illumination light and the optical path of the HDR illumination light. Further, the half-wave retarder 57 is disposed on one of the optical path of the SDR illumination light and the optical path of the HDR illumination light. Thereby, one of the polarized lights is rotated by 90°. This makes it possible to align the polarization of the SDR illumination light and the polarization of the HDR illumination light.

Note that, in the example in FIG. 8, the half-wave retarder 57 is disposed on the optical path of the SDR illumination light to convert the SDR illumination light from the S-polarized light into the P-polarized light. Note that the half-wave retarder 57 may be disposed on the optical path of the HDR illumination light to convert the HDR illumination light from the P-polarized light into the S-polarized light.

In the projector 101D according to the fourth configuration example, it is necessary to spatially separate the SDR illumination light and the HDR illumination light once by the polarization beam splitter 55 or the like. However, thereafter, it is preferable to so synthesize the SDR illumination light and the HDR illumination light on the transmissive liquid crystal display device 51T at an angle as shallow as possible that the SDR illumination light and the HDR illumination light are included within an acceptable angular range in the optical system from the transmissive liquid crystal display device 51T to the projection lens 53.

Other configurations may be substantially similar to those of the projector 101 illustrated in FIG. 4 or the projector 101A illustrated in FIG. 5.

Moreover, in the projector 101D illustrated in FIG. 8, the light source section 30 may be configured by the light source section 30A including the PS converter 32, as with the projector 101B illustrated in FIG. 6.

Fifth Configuration Example

Figure 9:
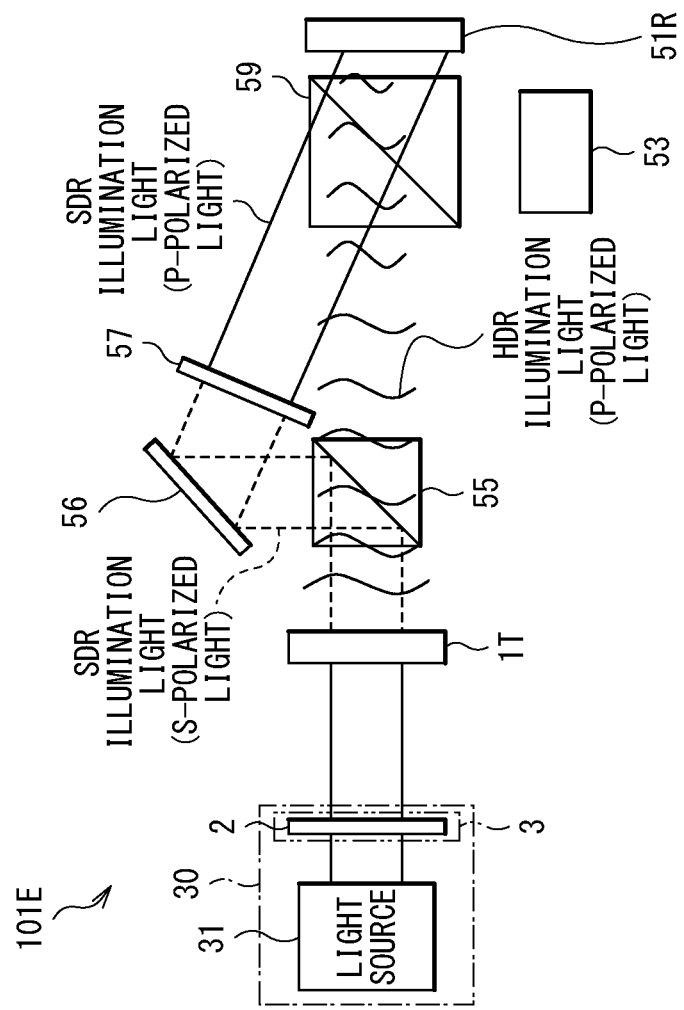
FIG. 9 is a configuration diagram schematically illustrating a configuration of a main part of a projector according to a fifth configuration example of the first embodiment.

FIG. 9 schematically illustrates a configuration of a main part of a projector 101E according to a fifth configuration example of the first embodiment.

The projector 101E according to the fifth configuration example describes a configuration example in a case where the diffractor 1 is the transmissive diffractor 1T (a transmissive optical phase modulator), and the light intensity modulator 51 is a reflective liquid crystal display device 51R (a reflective light intensity modulator). The transmissive diffractor 1T is, for example, a transmissive liquid crystal display device.

Moreover, the projector 101E according to the fifth configuration example includes the polarization beam splitter 55, the reflection mirror 56, the half-wave retarder 57, and a polarization beam splitter 59. The half-wave retarder 57 corresponds to one specific example of the second half-wave retarder in the technology of the present disclosure. The polarization beam splitter 59 is disposed in front of the reflective liquid crystal display device 51R.

The polarization beam splitter 55 is an optical path separator that separates the optical path of the SDR illumination light emitted from the transmissive diffractor 1T and the optical path of the HDR illumination light emitted from the transmissive diffractor 1T.

The half-wave retarder 57 is disposed on one of the optical path of the SDR illumination light and the optical path of the HDR illumination light.

In a case where the light intensity modulator 51 is the reflective liquid crystal display device 51R, it is necessary that the polarization of the SDR illumination light and the polarization of the HDR illumination light are aligned. Therefore, first, a device that performs separation on the basis of polarization, for example, the polarization beam splitter 55, is disposed between the transmissive diffractor 1T and the reflective liquid crystal display device 51R to separate the optical path of the SDR illumination light and the optical path of the HDR illumination light. Further, the half-wave retarder 57 is disposed on one of the optical path of the SDR illumination light and the optical path of the HDR illumination light. Thereby, one of the polarized lights is rotated by 90°. This makes it possible to align the polarization of the SDR illumination light and the polarization of the HDR illumination light.

Note that, in the example in FIG. 9, the half-wave retarder 57 is disposed on the optical path of the SDR illumination light to convert the SDR illumination light from the S-polarized light into the P-polarized light. Note that the half-wave retarder 57 may be disposed on the optical path of the HDR illumination light to convert the HDR illumination light from the P-polarized light into the S-polarized light.

In the projector 101E according to the fifth configuration example, it is necessary to spatially separate the SDR illumination light and the HDR illumination light once by the polarization beam splitter 55 or the like. However, thereafter, it is preferable to so synthesize the SDR illumination light and the HDR illumination light on the reflective liquid crystal display device 51R at an angle as shallow as possible that the SDR illumination light and the HDR illumination light are included within an acceptable angular range in the optical system from the reflective liquid crystal display device 51R to the projection lens 53.

Other configurations may be substantially similar to those of the projector 101 illustrated in FIG. 4 or the projector 101D illustrated in FIG. 8.

Moreover, in the projector 101E illustrated in FIG. 9, the light source section 30 may be configured by the light source section 30A including the PS converter 32, as with the projector 101B illustrated in FIG. 6.

Sixth Configuration Example

Figure 10:
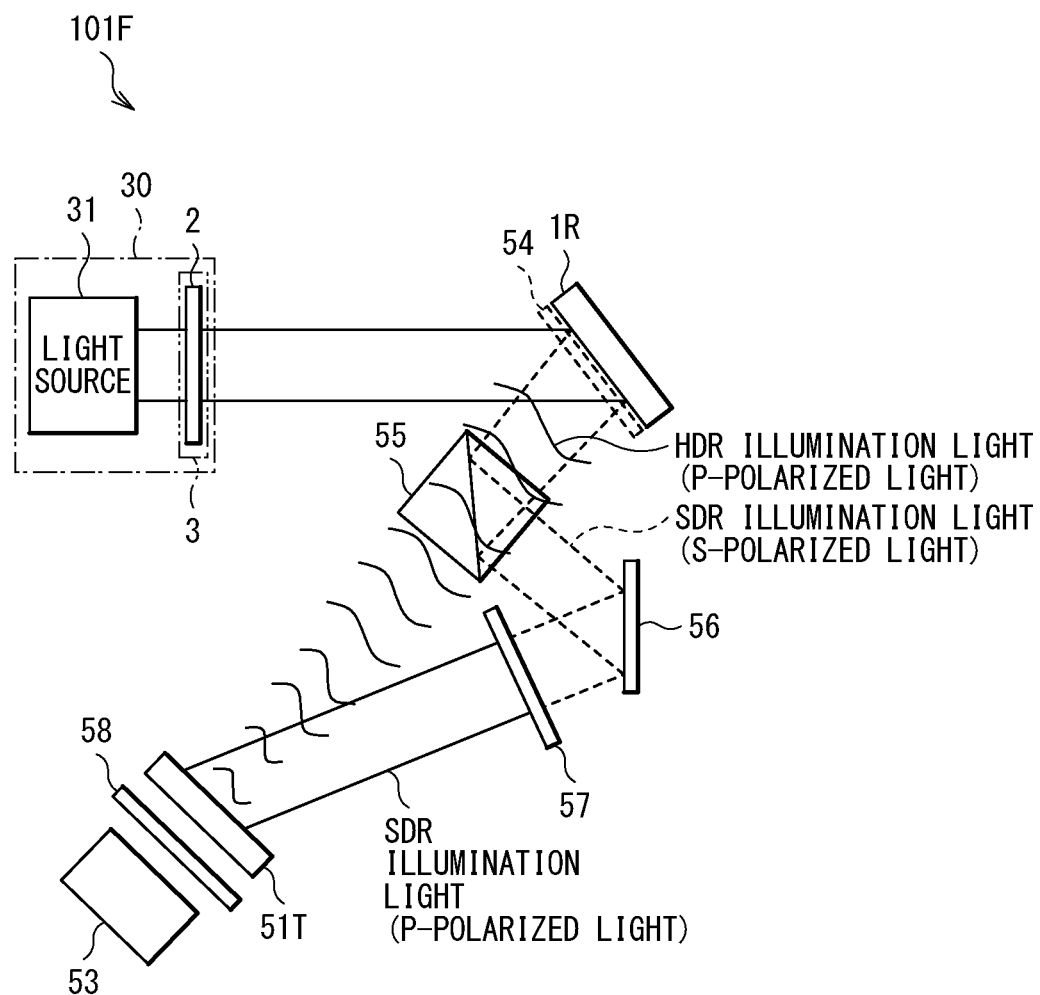
FIG. 10 is a configuration diagram schematically illustrating a configuration of a main part of a projector according to a sixth configuration example of the first embodiment.

FIG. 10 schematically illustrates a configuration of a main part of a projector 101F according to a sixth configuration example of the first embodiment.

The projector 101F according to the sixth configuration example describes a configuration example in a case where the diffractor 1 is the reflective diffractor 1R (a reflective optical phase modulator), and the light intensity modulator 51 is the transmissive liquid crystal display device 51T (a transmissive light intensity modulator). The reflective diffractor 1R is, for example, a reflective liquid crystal display device.

Note that, although not necessarily required, it is preferable that the wire grid polarizer 54 be disposed in front of the reflective diffractor 1R. Alternatively, it is preferable that a surface of the reflective diffractor 1R be provided with a polarization-separation coating that highly reflects the S-polarized light and highly transmits the P-polarized light. As a result, an improvement in light use efficiency is expectable.

Other configurations may be substantially similar to that of the projector 101D according to the fourth configuration example illustrated in FIG. 8.

Moreover, in the projector 101F illustrated in FIG. 10, the light source section 30 may be configured by the light source section 30A including the PS converter 32, as with the projector 101B illustrated in FIG. 6.

Seventh Configuration Example

Figure 11:
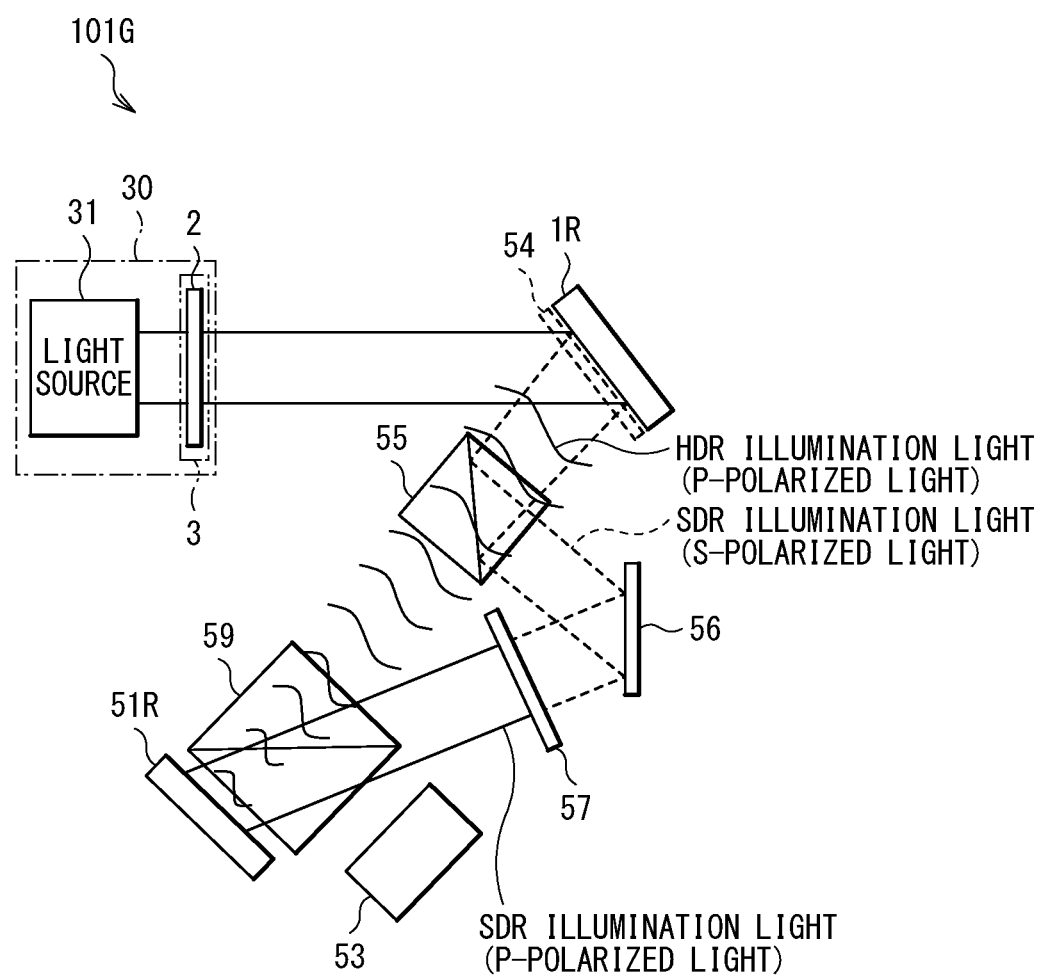
FIG. 11 is a configuration diagram schematically illustrating a configuration of a main part of a projector according to a seventh configuration example of the first embodiment.

FIG. 11 schematically illustrates a configuration of a main part of a projector 101G according to a seventh configuration example of the first embodiment.

The projector 101G according to the seventh configuration example describes a configuration example in a case where the diffractor 1 is the reflective diffractor 1R (a reflective optical phase modulator), and the light intensity modulator 51 is the reflective liquid crystal display device 51R (a reflective light intensity modulator). The reflective diffractor 1R is, for example, a reflective liquid crystal display device.

Note that, although not necessarily required, it is preferable that the wire grid polarizer 54 be disposed in front of the reflective diffractor 1R. Alternatively, it is preferable that a surface of the reflective diffractor 1R be provided with a polarization-separation coating that highly reflects the S-polarized light and highly transmits the P-polarized light. As a result, an improvement in light use efficiency is expectable.

Other configurations may be substantially similar to those of the projector 101E illustrated in FIG. 9.

Moreover, in the projector 101F illustrated in FIG. 11, the light source section 30 may be configured by the light source section 30A including the PS converter 32, as with the projector 101B illustrated in FIG. 6.

Eighth Configuration Example

Figure 12:
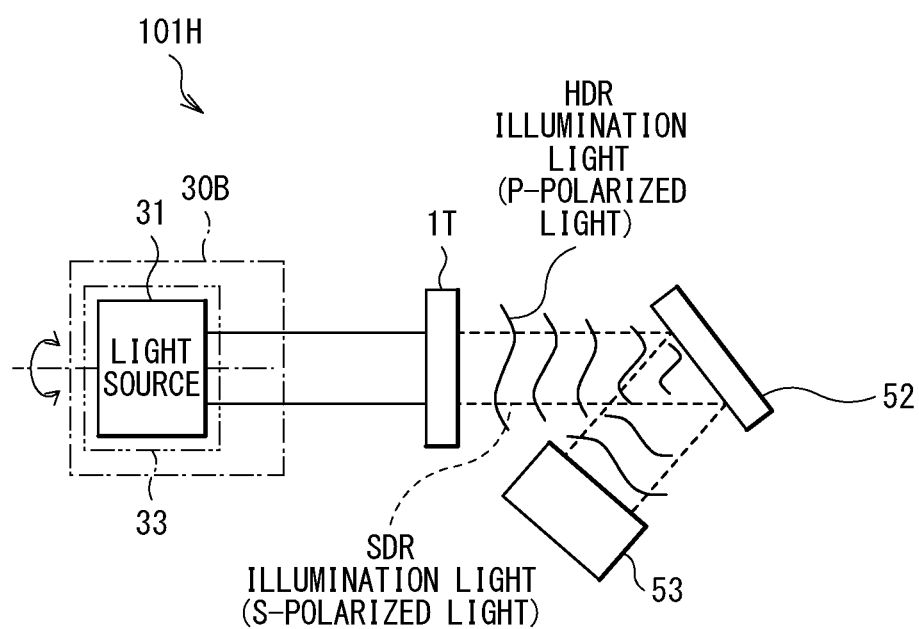
FIG. 12 is a configuration diagram schematically illustrating a configuration of a main part of a projector according to an eighth configuration example of the first embodiment.

FIG. 12 schematically illustrates a configuration of a main part of a projector 101H according to an eighth configuration example of the first embodiment.

The projector 101H according to the eighth configuration example includes a light source section 30B instead of the light source section 30 in the projector 101A according to the first configuration example illustrated in FIG. 5. The light source section 30B includes the light source 31 and a light source rotation mechanism 33 that rotates the light source 31.

In the projector 101H according to the eighth configuration example, instead of rotating the half-wave retarder 2, the light source 31 itself is rotated around the optical axis. This adjusts the light amount ratio between the SDR illumination light and the HDR illumination light. The light source 31 emits linearly polarized light.

In the projector 101H according to the eighth configuration example, the light source rotation mechanism 33 is controlled by the rotation angle control drive circuit 67 in the configuration in FIG. 4. The rotation angle of the light source 31 is calculated by the rotation angle calculation circuit 66 in the configuration in FIG. 4.

Compared with the configuration of the projector 101A according to the first configuration example illustrated in FIG. 5, the half-wave retarder 2 in the light source section 30 can be omitted in the projector 101H according to the eighth configuration example. However, the light emitted from the light source 31 needs to be linearly polarized. Therefore, for example, in a case of randomly polarized light, it is necessary to incorporate an optical device that aligns the polarization directions in the light source 31. Further, it is necessary to illuminate the entire surface of the transmissive diffractor 1T at any rotation angle. Therefore, the exit beam size of the light source 31 needs to be slightly larger than the transmissive diffractor 1T.

Other configurations may be substantially similar to those of the projector 101 illustrated in FIG. 4 or the projector 101A illustrated in FIG. 5.

Note that the configuration example in FIG. 12 is a modification of the configuration example in FIG. 5. However, the configuration examples in FIGS. 7 to 11 can also have a configuration in which the half-wave retarder 2 is removed and the light source 31 itself is rotated.

Moreover, in the projector 101F illustrated in FIG. 12, 30B may be configured by the light source section 30A including the PS converter 32, as with the projector 101B illustrated in FIG. 6.

[1.3 Effects]

As described above, according to the illuminator and the display apparatus according to the first embodiment, it is possible to achieve a high dynamic range with a simple configuration.

According to the illuminator and the display apparatus according to the first embodiment, the light from the single light source section is distributed at a freely-set ratio, and the SDR illumination light and the HDR illumination light are generated together by the diffractor (optical phase modulator). This makes it unnecessary to provide more than one light source section, making the optical system very simple.

Moreover, according to the illuminator and the display apparatus according to the first embodiment, it is possible to change the light amount distribution rate in accordance with each frame of the projection image. Consequently, for example, in a scene with no region having a high luminance level, all of the light can be used as the SDR illumination light. In contrast, in a scene, such as a star sky, in which shiny parts are scattered in a totally dark scene, all of the light can be used as the HDR illumination light. This results in high peak luminance. This also improves insufficient blackness in the black region that is degraded by an influence of slight leakage of light at the light intensity modulator. Thus, the distribution ratio between the SDR illumination light and the HDR illumination light can be freely varied in accordance with the scene. Consequently, it is possible to achieve an image having high-peak luminance and a high contrast.

Note that it is also possible to generate illumination light resulting from synthesis of the HDR illumination light and the SDR illumination light by the diffractor of a liquid crystal device or the like. However, in this case, the light to be the SDR illumination light is also generated by diffraction. As a result, diffraction loss due to high-order diffracted light, or loss caused by periodic generation of diffracted light resulting from the pixel structure of the liquid crystal device mainly occurs. Therefore, the technology according to the present embodiment is higher in efficiency for the amount of the diffraction loss of the SDR illumination light.

Note that the effects described in the present specification are merely illustrative and not limitative, and any other effect may be provided.

2. Other Embodiments

The technology according to the present disclosure is not limited to the description of the foregoing embodiment, and may be modified in a variety of ways.

For example, the present technology may also have any of the following configurations.

According to the present technology having any of the following configurations, it is possible to achieve a high dynamic range with a simple configuration.

(1)

An illuminator including:

a light source section that emits light including a first polarization component and a second polarization component, the first polarization component and the second polarization component being different from each other in polarization direction; and an optical phase modulator that generates first illumination light and second illumination light on the basis of the light emitted from the light source section and emits the first illumination light and the second illumination light, the first illumination light being used in a light intensity modulator to generate an image in a first luminance region, the second illumination light being used in the light intensity modulator to generate an image in a second luminance region, the second luminance region having a luminance higher than that of the first luminance region, in which the optical phase modulator emits, as the first illumination light, light of the first polarization component of the light emitted from the light source section without performing phase modulation, and the optical phase modulator performs phase modulation on light of the second polarization component of the light emitted from the light source section on the basis of the image in the second luminance region, and emits the phase-modulated light as the second illumination light.

(2)

The illuminator according to (1) described above, in which the light source section has a configuration in which a polarization ratio between the first polarization component and the second polarization component is variable.

(3)

The illuminator according to (2) described above, in which the light source section includes
  a light source,
  a first half-wave retarder which the light emitted from the light source enters, and
  a half-wave retarder rotation mechanism that rotates the first half-wave retarder.

(4)

The illuminator according to (2) described above, in which the light source section includes
  a light source, and
  a light source rotation mechanism that rotates the light source.

(5)

The illuminator according to any one of (2) to (4) described above, further including a calculating section that determines the polarization ratio of the light source section on the basis of an image signal.

(6)

The illuminator according to (5) described above, in which the calculating section determines the polarization ratio to cause a light amount of the first illumination light to be a light amount corresponding to a ratio of the image in the first luminance region included in the image signal and to cause a light amount of the second illumination light to be a light amount corresponding to a ratio of the image in the second luminance region included in the image signal.

(7)

The illuminator according to (6) described above, in which the calculating section determines the polarization ratio to cause a light amount ratio between the light amount of the first illumination light and the light amount of the second illumination light to be a value based on a shooting mode used upon generation of the image signal.

(8)

The illuminator according to (6) or (7) described above, in which the calculating section determines the polarization ratio to cause a light amount ratio between the light amount of the first illumination light and the light amount of the second illumination light to be a value based on a light amount loss caused upon phase modulation performed by the optical phase modulator.

(9)

The illuminator according to any one of (1) to (8) described above, in which
  the optical phase modulator includes a transmissive or reflective optical phase modulator, and
  the light intensity modulator includes a digital micromirror device.

(10)

The illuminator according to any one of (1) to (8) described above, in which
  the optical phase modulator includes a transmissive or reflective optical phase modulator, and
  the light intensity modulator includes a transmissive or reflective liquid crystal display device.

(11)

The illuminator according to (10) described above, further including:
  an optical path separator that separates an optical path of the first illumination light emitted from the optical phase modulator and an optical path of the second illumination light emitted from the optical phase modulator; and
  a second half-wave retarder that is disposed on one of the optical path of the first illumination light and the optical path of the second illumination light.

(12)

A display apparatus including:
  an illuminator; and
  a light intensity modulator that performs intensity modulation on illumination light from the illuminator to generate an image,
  the illuminator including
    a light source section that emits light including a first polarization component and a second polarization component, the first polarization component and the second polarization component being different from each other in polarization direction, and
    an optical phase modulator that generates first illumination light and second illumination light on the basis of the light emitted from the light source section and emits the first illumination light and the second illumination light, the first illumination light being used in a light intensity modulator to generate an image in a first luminance region, the second illumination light being used in the light intensity modulator to generate an image in a second luminance region, the second luminance region having a luminance higher than that of the first luminance region, in which
  the optical phase modulator emits, as the first illumination light, light of the first polarization component of the light emitted from the light source section without performing phase modulation, and
  the optical phase modulator performs phase modulation on light of the second polarization component of the light emitted from the light source section on the basis of the image in the second luminance region, and emits the phase-modulated light as the second illumination light.

(13)

The display apparatus according to (12) described above, further including a projection optical system that projects the image generated by the light intensity modulator.

The present application claims priority based on Japanese Patent Application No. 2018-162309 filed with the Japan Patent Office on Aug. 31, 2018, the entire content of which is incorporated herein by reference.

It should be understood that those skilled in the art would make various modifications, combinations, sub-combinations, and alterations depending on design requirements and other factors, and they are within the scope of the attached claims or the equivalents thereof.

What is claimed is:

1. An illuminator comprising:
  a light source section that emits light including a first polarization component and a second polarization component, the first polarization component and the second polarization component being different from each other in polarization direction; and
  an optical phase modulator that generates first illumination light and second illumination light on a basis of the light emitted from the light source section and emits the first illumination light and the second illumination light, the first illumination light being used in a light intensity modulator to generate an image in a first luminance region, the second illumination light being used in the light intensity modulator to generate an image in a second luminance region, the second luminance region having a luminance higher than that of the first luminance region, wherein the optical phase modulator emits, as the first illumination light, light of the first polarization component of the light emitted from the light source section without performing phase modulation, and the optical phase modulator performs phase modulation on light of the second polarization component of the light emitted from the light source section on a basis of the image in the second luminance region, and emits the phase-modulated light as the second illumination light.

2. The illuminator according to claim 1, wherein the light source section has a configuration in which a polarization ratio between the first polarization component and the second polarization component is variable.

3. The illuminator according to claim 2, wherein
the light source section includes
a light source,
a first half-wave retarder which the light emitted from the light source enters, and
a half-wave retarder rotation mechanism that rotates the first half-wave retarder.

4. The illuminator according to claim 2, wherein
the light source section includes
a light source, and
a light source rotation mechanism that rotates the light source.

5. The illuminator according to claim 2, further comprising a calculating section that determines the polarization ratio of the light source section on a basis of an image signal.

6. The illuminator according to claim 5, wherein the calculating section determines the polarization ratio to cause a light amount of the first illumination light to be a light amount corresponding to a ratio of the image in the first luminance region included in the image signal and to cause a light amount of the second illumination light to be a light amount corresponding to a ratio of the image in the second luminance region included in the image signal.

7. The illuminator according to claim 6, wherein the calculating section determines the polarization ratio to cause a light amount ratio between the light amount of the first illumination light and the light amount of the second illumination light to be a value based on a shooting mode used upon generation of the image signal.

8. The illuminator according to claim 6, wherein the calculating section determines the polarization ratio to cause a light amount ratio between the light amount of the first illumination light and the light amount of the second illumination light to be a value based on a light amount loss caused upon phase modulation performed by the optical phase modulator.

9. The illuminator according to claim 1, wherein
the optical phase modulator comprises a transmissive or reflective optical phase modulator, and
the light intensity modulator comprises a digital micromirror device.

10. The illuminator according to claim 1, wherein
the optical phase modulator comprises a transmissive or reflective optical phase modulator, and
the light intensity modulator comprises a transmissive or reflective liquid crystal display device.

11. The illuminator according to claim 10, further comprising:
an optical path separator that separates an optical path of the first illumination light emitted from the optical phase modulator and an optical path of the second illumination light emitted from the optical phase modulator; and
a second half-wave retarder that is disposed on one of the optical path of the first illumination light and the optical path of the second illumination light.

12. A display apparatus comprising:
an illuminator; and
a light intensity modulator that performs intensity modulation on illumination light from the illuminator to generate an image,
the illuminator including
a light source section that emits light including a first polarization component and a second polarization component, the first polarization component and the second polarization component being different from each other in polarization direction, and
an optical phase modulator that generates first illumination light and second illumination light on a basis of the light emitted from the light source section and emits the first illumination light and the second illumination light, the first illumination light being used in a light intensity modulator to generate an image in a first luminance region, the second illumination light being used in the light intensity modulator to generate an image in a second luminance region, the second luminance region having a luminance higher than that of the first luminance region, wherein
the optical phase modulator emits, as the first illumination light, light of the first polarization component of the light emitted from the light source section without performing phase modulation, and
the optical phase modulator performs phase modulation on light of the second polarization component of the light emitted from the light source section on a basis of the image in the second luminance region, and emits the phase-modulated light as the second illumination light.

13. The display apparatus according to claim 12, further comprising a projection optical system that projects the image generated by the light intensity modulator.

* * * * *